United States Patent [19]

Itoh et al.

[11] Patent Number: 5,794,081
[45] Date of Patent: Aug. 11, 1998

[54] CAMERA CAPABLE OF DETECTING CAMERA SHAKE AND COMPENSATING IMAGE BLUR DUE TO CAMERA SHAKE

[75] Inventors: Junichi Itoh, Hachioji; Tatsuya Satoh, Machida; Yoshinori Matsuzawa, Hachioji; Yasuo Tanbara, Hino, all of Japan

[73] Assignee: Olympus Optical Co., Ltd., Tokyo, Japan

[21] Appl. No.: 808,226

[22] Filed: Feb. 28, 1997

Related U.S. Application Data

[63] Continuation of Ser. No. 397,708, Mar. 1, 1995, abandoned.

[30] Foreign Application Priority Data

Mar. 3, 1994 [JP] Japan ..................... 6-033768

[51] Int. Cl.[6] ............................. G03B 17/00
[52] U.S. Cl. ............................. 396/55; 396/303
[58] Field of Search ............... 396/301, 302, 396/303, 221, 52, 53, 54, 55

[56] References Cited

U.S. PATENT DOCUMENTS

| | | | |
|---|---|---|---|
| 5,153,633 | 10/1992 | Otani | 354/430 |
| 5,204,709 | 4/1993 | Sato | 354/266 |
| 5,245,378 | 9/1993 | Washisu | 354/410 |
| 5,307,113 | 4/1994 | Egawa | 354/430 |
| 5,353,091 | 10/1994 | Ishida et al. | 354/410 |
| 5,416,554 | 5/1995 | Hamada et al. | 354/400 |
| 5,530,515 | 6/1996 | Saegusa et al. | 354/412 |
| 5,659,807 | 8/1997 | Nakamura et al. | 396/55 |
| 5,682,556 | 10/1997 | Iwane et al. | 396/55 |
| 5,701,521 | 12/1997 | Ohishi et al. | 396/52 |

FOREIGN PATENT DOCUMENTS 4-348329  12/1992  Japan.

*Primary Examiner*—Safet Metjahic
*Assistant Examiner*—John Chizmer
*Attorney, Agent, or Firm*—Kenyon & Kenyon

[57] ABSTRACT

A camera with shake compensation which detects camera shake and cancels image blur on a film exposing aperture due to the shake. The camera is capable of conserving battery power by automatically entering a power saving stand-by mode in which some of the functional blocks of the camera are powered down. The camera includes a selectable shake compensation mode, camera shake detecting circuits, and a control circuit that does not allow the shake detecting circuits from entering stand-by mode whenever the shake compensation mode is active. As a result, the camera is ready to perform shake compensation immediately upon exiting stand-by mode.

11 Claims, 14 Drawing Sheets

(a)

(b)

CAMERA CAPABLE OF DETECTING CAMERA SHAKE AND COMPENSATING IMAGE BLUR DUE TO CAMERA SHAKE

This is a continuation of application Ser. No. 08/397,708 filed on Mar. 1, 1995 now abandoned.

FIELD OF THE INVENTION

The present invention relates generally to an apparatus for reducing the effects of camera shake, and more particularly to a camera having a stand-by powering mode and a shake compensation mode.

BACKGROUND INFORMATION

Acceleration sensors, angular displacement sensors, and angular velocity sensors have been used as shake detecting sensors in optical instruments such as video and still cameras.

FIG. 13 shows a gyrostabilizer using an equilateral triangular rod type vibrator as an example of an angular velocity sensor. A driving piezoelectric device 101a is mounted on one side of a vibrator body 100, and feedback piezoelectric devices 101b and 101c are respectively mounted on the other two sides of the body 100. An oscillator circuit 102 is coupled to the driving piezoelectric device 101a and the feedback piezoelectric devices 101b and 101c. Outputs of the feedback piezoelectric devices 101b and 101c are fed back to the driving piezoelectric device 101a via the oscillator circuit 102, and thus the vibrator 100 can oscillate by itself. The difference between the output voltages of the feedback piezoelectric devices 101b and 101c is proportional to an angular velocity imparted to the vibrator body 100 by shaking, which voltage difference is detected by a differential circuit 103.

The output voltage of the differential circuit 103 should be zero whenever the angular velocity of the vibrator body 100 is zero. In actuality, however, superimposed on the output voltage of the differential circuit 103 are a component from a shake signal and a component from an offset signal contributed by the differential circuit 103. The component of the output signal of the differential circuit 103 due to shaking is in the frequency range of 1 to 10 Hz. A high-pass filter 104 is used for discriminating the shake signal from the offset signal. In order to completely discriminate the shake signal from the offset signal, the cutoff frequency of the high-pass filter is set around 0.1 Hz.

FIG. 15 shows a schematic diagram of a secondorder high-pass filter 104 whose cutoff frequency is set at 0.1 Hz. In this circuit configuration, C1 and C2 have values of 4.7 µF, R1 is 510 Kohms, and R2 is 680 Kohms.

FIG. 16 shows the transient response of the highpass filter 104 to a 1 Volt step-function. As shown in FIG. 16, because of the filter's low cutoff frequency, a considerably long time period is required for the filter 104 to completely eliminate the DC component of the input signal. On the other hand, the time required for the output voltage of the differential circuit 103 to settle after the application of power is shorter than that of the high-pass filter 104. Because the settling time of the high-pass filter 104 is considerable, offset signal elimination cannot be performed for a predetermined time period after power is applied to the gyrostabilizer and the high-pass filter 104. Shake compensation, however, cannot be performed until the offset signal is eliminated. Although this problem can be solved by eliminating the high-pass filter 104, the high-pass filter 104 actually cannot be eliminated because of difficulties in filtering the offset signal from the gyrostabilizer output.

Typically, cameras are operated with batteries as power sources. Batteries, however, have finite powersupplying capacity. In order to conserve battery power, most cameras have the ability to enter a so-called stand-by mode if no camera operations are performed after turning on a power switch of the camera. In a typical stand-by mode, power consumption is reduced by stopping the camera's microprocessor or by operating said microprocessor at a reduced clock speed, while other camera circuits are stopped as well.

Japanese Laid-Open Patent Application Publication No. 4-348329 describes a camera that powers-up in response to a camera operation (e.g., depressing the shutter release switch, zooming), and shuts the supply of power to a shake compensating apparatus automatically if no camera operation is detected for a predetermined time period. This approach makes sense only when using a shake sensor without the problem described above.

As mentioned above, most cameras enter the stand-by mode after being turned on if no camera operation is detected for a predetermined time period. If power to the shake sensor circuit is shut down as a result of entering the stand-by mode, camera shake compensation cannot be performed immediately after leaving the stand-by mode.

Because the internal state of the microprocessor before proceeding to the stand-by mode is saved during the stand-by mode, the camera can wake up to its normal operating mode immediately by inputting any camera operation. But camera shake compensation cannot be performed immediately if power to the gyrostabilizer and the high-pass filter is shut down upon entering the stand-by mode.

According to Japanese Laid-Open Patent Application Publication No. 4-348329, camera shake compensation cannot be done immediately if power to the camera shake sensor is removed.

To summarize the problem discussed above, it is not desirable to remove power to the camera shake sensor upon entering stand-by mode. Eliminating stand-by mode in order to solve this problem is also not desirable because of the need to conserve the finite power supplying capacity of the camera's batteries.

SUMMARY OF THE INVENTION

An object of the present invention is to provide a camera capable of shake compensation which can enter a stand-by mode without compromising the performance of shake compensation.

In order to achieve the aforementioned object, in accordance with the present invention, a camera capable of detecting camera shake and compensating image blur due to camera shake on an exposure aperture, comprises: a mode setting means for setting the camera to a shake compensating mode; a stand-by mode transition means for changing the camera from a normal operating mode to a stand-by mode in which a minimum number of the camera functions are enabled when no camera operation is carried out within a predetermined time period; and mode transition prohibiting means for prohibiting the camera from entering the stand-by mode whenever the camera is in the shake compensating mode.

This and other objects, advantages and features of the present invention will become readily apparent to those skilled in the art in light of the following detailed description and accompanying drawings.

DETAILED DESCRIPTION

Figure 1:
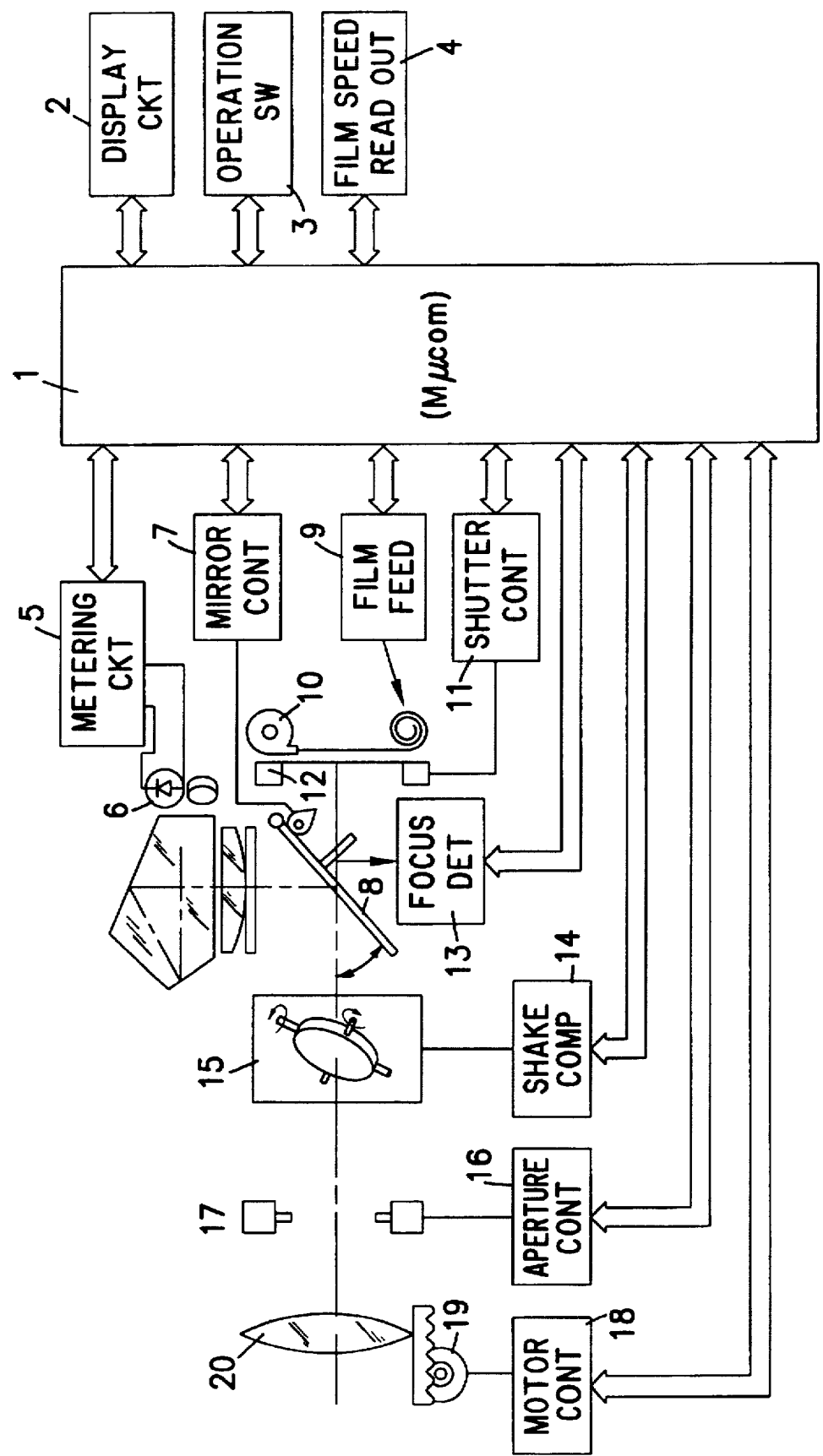
FIG. 1 illustrates a first exemplary embodiment of a camera in accordance with the present invention.

FIG. 1 shows a block diagram of a first embodiment of a camera with shake compensation in accordance with the present invention. The camera of FIG. 1 includes a main microcomputer (MµCOM) 1 for controlling the camera's operating sequence and performing camera operations. A display circuit 2 for displaying an operating mode and data generated by the MµCOM 1 camera operating switches 3, including a release switch, a main switch, and a mode switch; and a film speed read-out circuit 4 for reading out film speed are coupled to the MµCOM 1 A photoelectric device 6 for metering light is connected to a light metering circuit 5 which is in turn connected to the MµCOM 1 The light metering circuit 5 detects the brightness of an object on the basis of the photocurrent of the photoelectric device 6. The detected object brightness information is provided to the MµCOM 1

A mirror control block 7 for controlling the up/down motion of a quick return mirror 8, a film feed control block 9 for controlling the winding and rewinding of a loaded film 10, and a shutter control block 11 for controlling a leading blade and a trailing blade are connected to the MµCOM 1 A focus detecting circuit 13 for determining the required movement of a phototaking lens 20, a shake compensation circuit 14, an aperture control block 16 for controlling a diaphragm 17, and a motor control block 18 for controlling a motor 19 are also connected to the MµCOM 1 The shake compensation circuit 14 is a circuit for controlling shake detecting sensors and a shake compensation mechanism 15.

Figure 2:
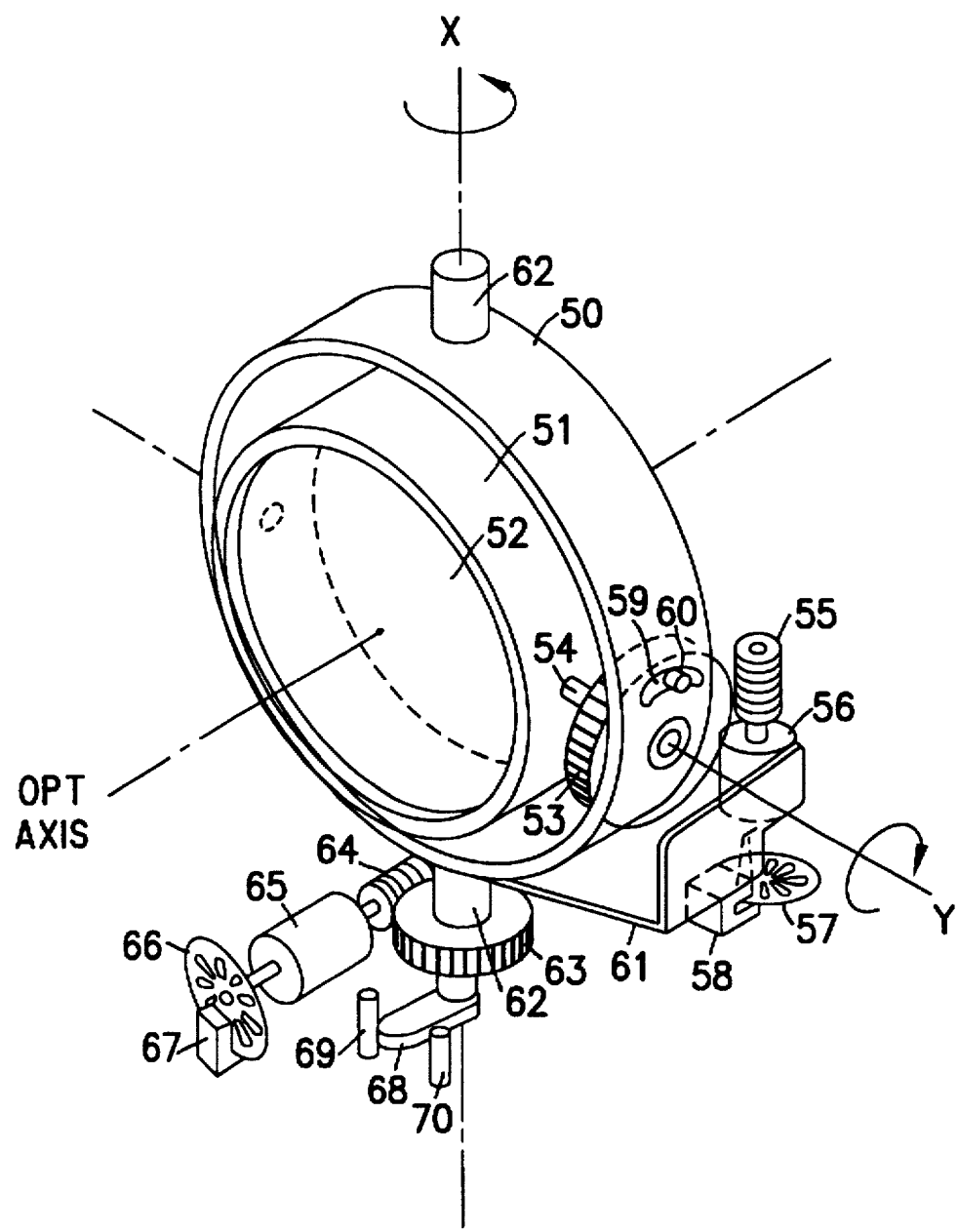
FIG. 2 illustrates a detailed configuration of a shake compensation mechanism of the first embodiment.

FIG. 2 shows a detailed view of the compensation mechanism 15. A parallel plate glass 52 is retained in an inner frame 51. A shaft 54 is fixed on the inner frame 54 and a gear 53. The inner frame 51 is retained rotatably with respect to an outer frame 50 by the shaft 54. A worm gear 55 transmits a rotational torque to the gear 53 from a y-axis motor 56. A disk 57 having radial slits is fixed to a shaft of the y-axis motor 56 so that pulse signals are generated by a photointerrupter 58 upon rotation of the disk 57. The rate of revolution of the y-axis motor 56 and the rotational displacement of the parallel plate glass 52 about the y-axis are determined using the pulse signals generated by the photointerrupter 58. A pin 60 and a groove 59 are provided for limiting the rotational range of the inner frame 51.

A retainer 61 is provided on the outer frame 50 to retain the y-axis motor 56 and the photointerrupter 58. A shaft 62 holds the outer frame 50 and the retainer 61 in rotational relationship with the camera body. A gear 63 is fixed to the shaft 62. A worm gear 64, driven by an x-axis motor 65, causes the gear 63 to rotate. A disk 66 with radial slits is fixed to a shaft of the axis motor 65, so that pulse signals are generated by a photointerrupter 67 as the disk 66 rotates. The rate of revolution of the x-axis motor 65 and the angular displacement of the parallel plate glass 52 about the x-axis are determined by detecting the pulse signals generated by the photointerrupter 67. A lever 68 fixed to the shaft 62 and pins 69 and 70 fixed on the camera body limit the range of rotation of the outer frame 50.

In the first exemplary embodiment of the present invention, shown in FIGS. 1 and 2, image displacement due to camera shake is canceled by rotating the parallel plate glass 52, using the gimbal ring assembly discussed above, in accordance with the detected camera shake.

Figure 3:
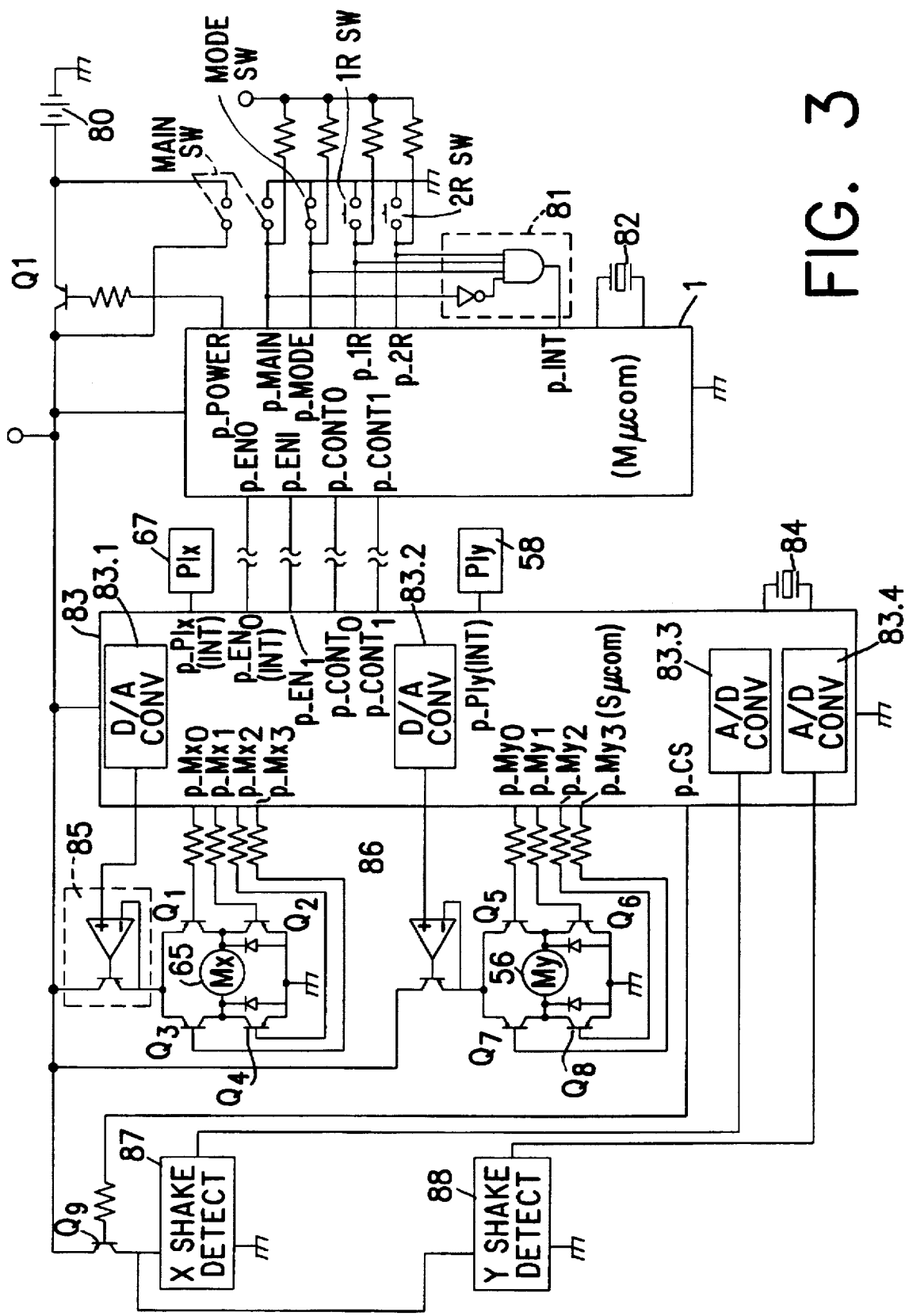
FIG. 3 illustrates a detailed configuration of a shake compensation circuit of the first embodiment.

Composition of the shake compensation circuit 14 and the operation switches 3 will now be described with reference to FIG. 3. The operation switches include a main switch (MAINSW), a mode switch (MODESW), a first release switch (1RSW) and a second release switch (2RSW). Each switch is respectively connected to input ports p_MAIN, p_MODE, p_1R, and p_2R of the MµCOM 1. The MAINSW controls the supply of power to the camera and is comprised of a pair of ganged switches. When the MAINSW is turned on, power is supplied to the camera system from a battery 80 and the MµCOM 1 is initialized and begins to operate. When the MµCOM 1 is initialized, an output port p_POWER of the MµCOM 1 transitions from a logic HIGH level to a logic LOW level turning on a transistor Q1 so that the supply of power is maintained.

The MODESW is a switch for selecting whether the shake compensation is active or not. The 1RSW and 2RSW switches operate in conjunction with the shutter release button. The 1RSW is turned on when the release button is depressed at least halfway of its full stroke. The 2RSW is turned on when the release button is fully depressed. A gate circuit 81, whose output is coupled to an input port p_INT of the MµCOM 1 generates an interrupt signal which causes the MµCOM 1to come out of stand-by mode upon activation of any one of the operating switches. A resonator 82 is used for generating the operating clock signal of the MµCOM 1

A secondary microcomputer (SµCOM) 83 controls the shake compensation operation. The SµCOM 83 is controlled by input commands from output ports p_EN0, p_EN1, p_CONT0 and p_CONT1 of the MµCOM 1.

The photointerrupter 67 (FIG. 2) generates pulse signals on the basis of the revolution of the x-axis motor 65 in the gimbal ring. The pulse signals generated by the photointerruptor 67 are applied to an input port p_PIx of the SµCOM 83. The photointerrupter 58 (FIG. 2) generates pulse signals on the basis of the revolution of the y-axis motor 56 in the gimbal ring. The pulse signals generated by the photointerruptor 58 are applied to an input port p_PIy of the SµCOM 83. Using the pulse signals generated by the photointerruptors 67 and 58, the SµCOM 83 detects the slant angles, with respect to the x and y axes, of the parallel plate glass 52, which angles correspond to the optical displacement of the glass.

Output signals of D/A converters 83.1 and 83.2 of the SµCOM 83 are amplified by buffers 85 and 86, respectively.

The amplified signals are applied, respectively, to a first bridge circuit comprising transistors Q1 through Q4, and to a second bridge circuit comprising transistors Q5 through Q8. The rates of revolution of the motors 65 and 56 are respectively regulated by the D/A converters 83.1 and 83.2. The first bridge circuit (Q1–Q4) drives the x-axis motor 65. The direction of rotation of the x-axis motor 65 is controlled by output ports p_Mx0 through p_Mx3 on the SμCOM 83. The second bridge circuit (Q5–Q8) drives the y-axis motor 56 whose direction of rotation is controlled by output ports p_My0 through p_My3.

Figure 13:
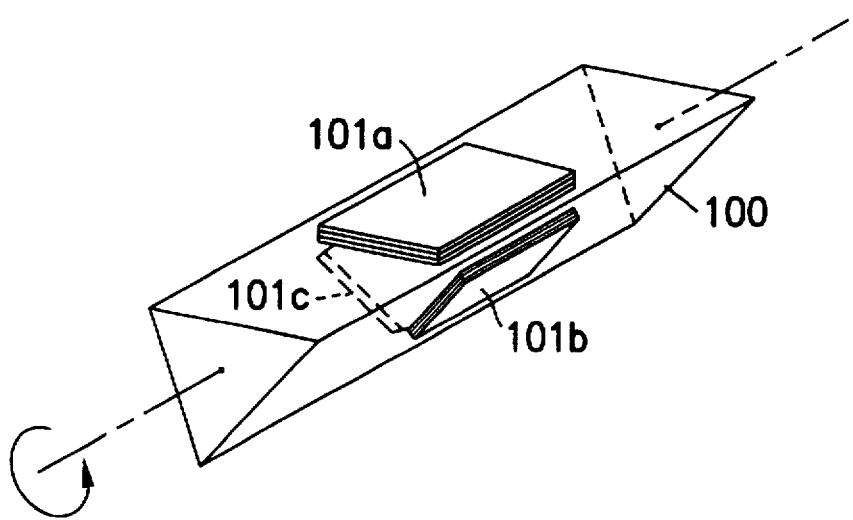
FIGS. 13 and 14 illustrate a vibrating gyrostabilizer using an equilateral triangular rod vibrator as an angular velocity sensor.
Figure 14:
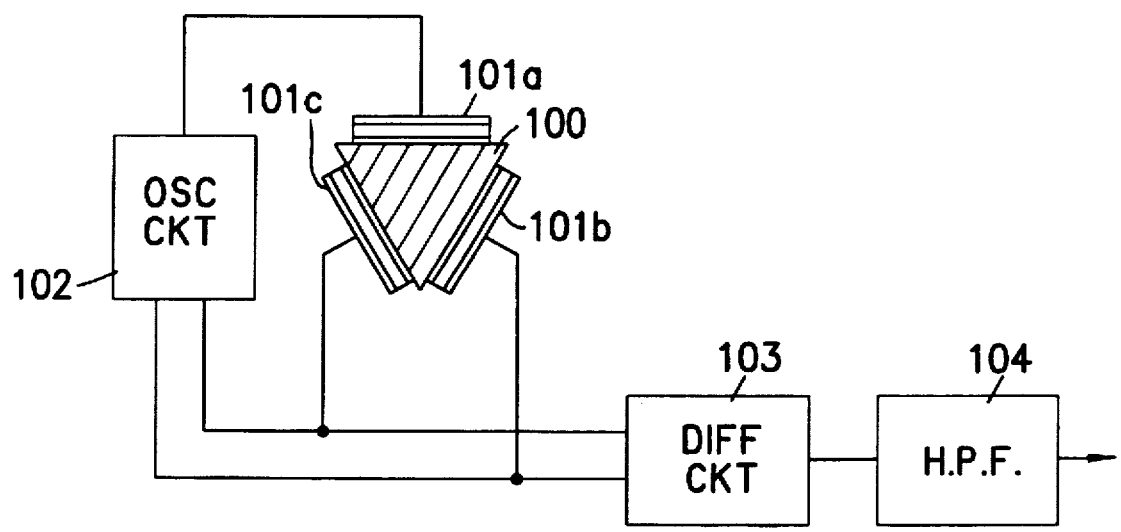
Figure 15:
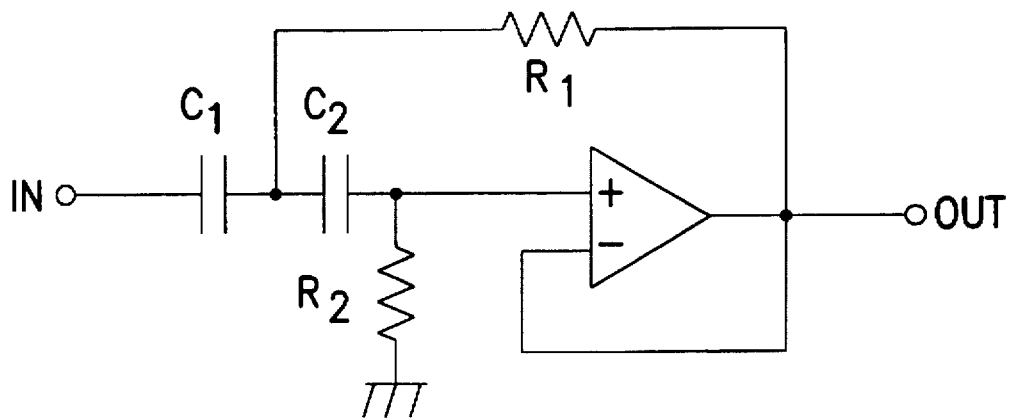
FIG. 15 is a schematic diagram of a high-pass filter.
Figure 16:
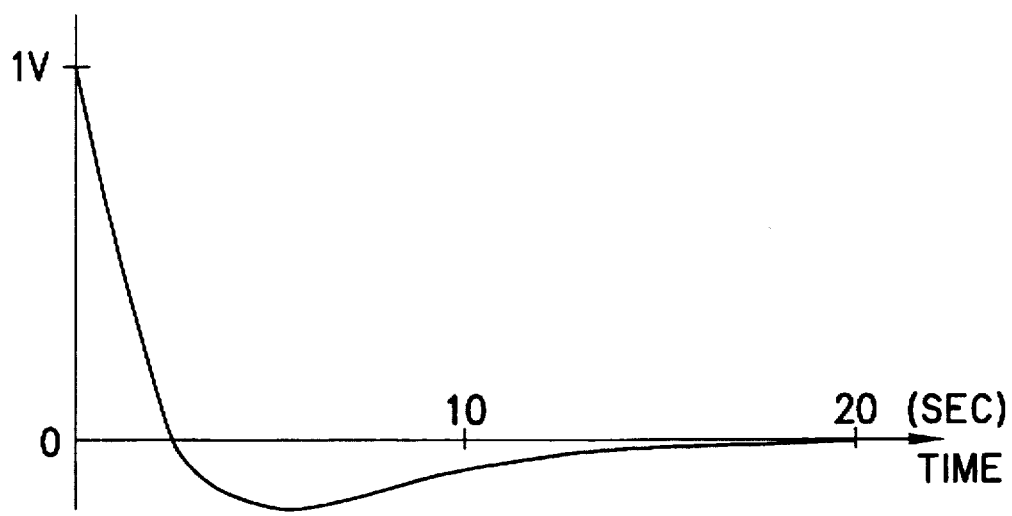
FIG. 16 illustrates the step-function transient response of the high-pass filter of FIG. 15.

An x-axis component of the camera shake is detected by an x-axis component shake detecting circuit 87, and a y-axis component of the camera shake is detected by a y-axis component shake detecting circuit 88. Each shake detecting circuit comprises a gyrostabilizer as shown in FIG. 13, and is supplied power via a transistor Q9 under the control of an output port p_CS of the SμCOM 83.

Output signals of the shake detecting circuits 87 and 88 are respectively applied to A/D converters 83.3 and 83.4 of the SμCOM 83. The x-axis component of the camera shake is canceled by driving the x-axis motor 65 as a function of the output of the A/D converter 83.3. The y-axis component of the camera shake is canceled by driving the y-axis motor 56 as a function of the output of the A/D converter 83.4. A resonator 82 is used for generating the operating clock signal of the SμCOM 83.

Figure 4:
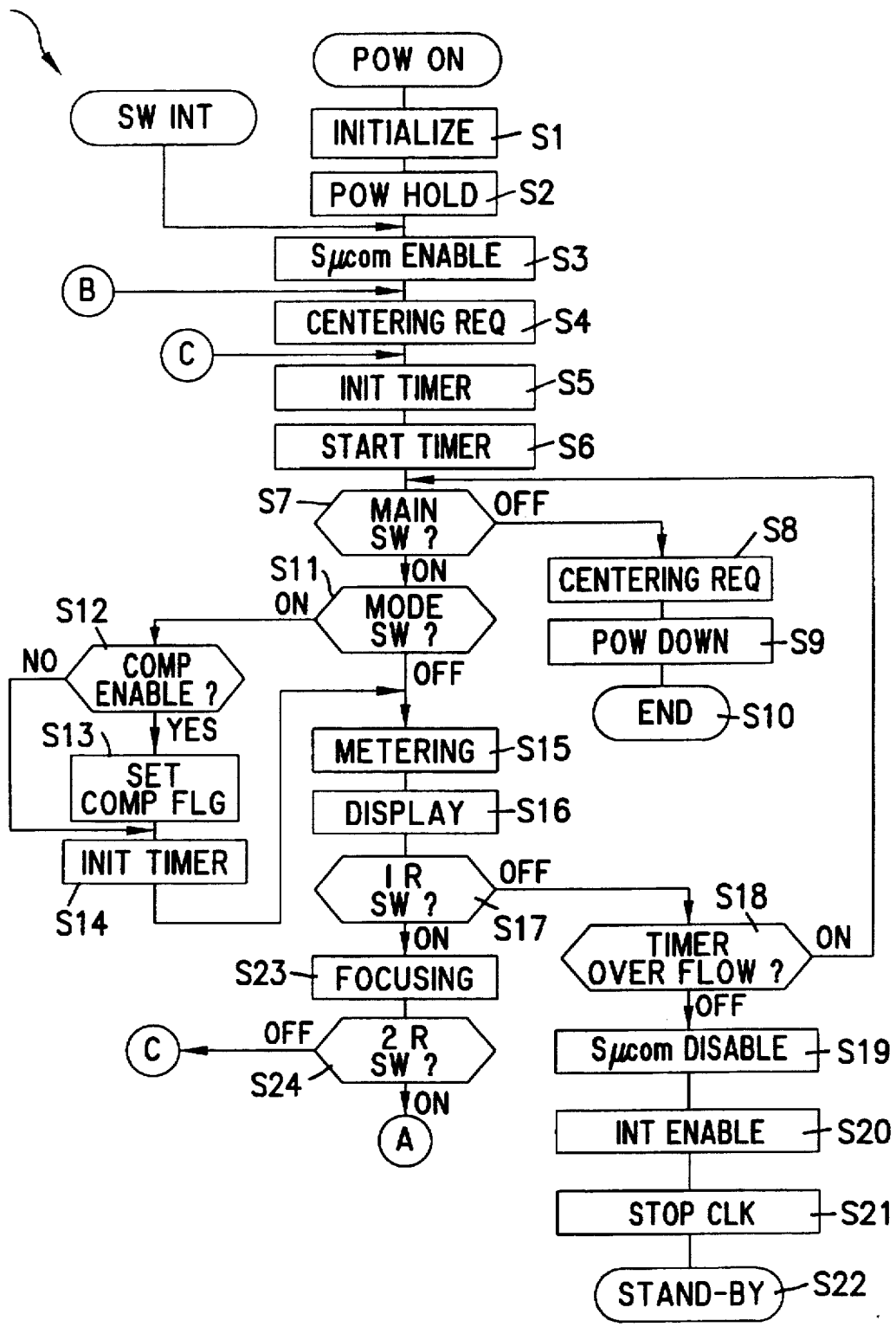
FIGS. 4 and 5 are flow-charts illustrating the operation of a main microcomputer of the first embodiment.
Figure 5:
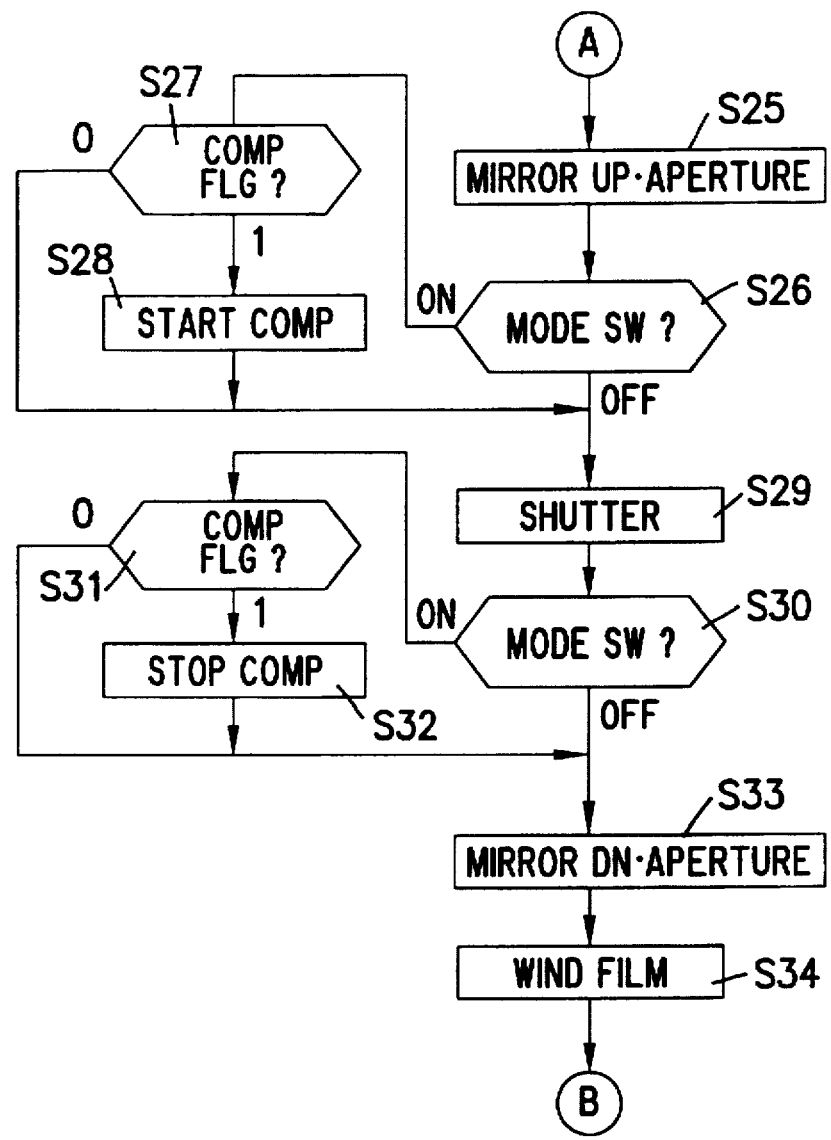

The operation of the MμCOM 1 will now be described with reference to the flow-charts of FIGS. 4 and 5. When the MAINSW is turned on, the MμCOM 1 begins its operation after initialization. At step S1, the MμCOM 1 initializes its I/O ports and internal memories, and at step S2 sets the output port p_POWER from a HIGH level to a LOW level in order to turn on the transistor Q1. The supply of power to the MμCOM 1 is maintained by keeping transistor Q1 on. At step S3, the output port p_EN0 is set from a HIGH level to a LOW level in order to enable operation of the SμCOM 83 which controls the shake canceling operation. A detailed description of the operation of the SμCOM 83 is provided further below.

Though the SμCOM 83 wakes up together with the MμCOM 1 the SμCOM 83 proceeds to stand-by mode automatically unless it is enabled by the MμCOM 1 The MμCOM 1 enables the SμCOM 83 to operate while it is operating regardless of whether the shake compensation mode is selected.

As described above, the camera cannot perform shake compensation immediately after the MAINSW is turned on because the output signals of the detecting circuits 87 and 88 require a considerably long time to settle. It is desirable that the shake detection circuits be ready for shake compensation as soon as possible after selection of the shake compensation mode.

At step S4, the MμCOM 1 outputs a centering request via the output port p_CONT0 to the SμCOM 83 in order to perform a centering operation. Upon receiving a centering request, the SμCOM 83 drives the parallel plate glass 52 to a position where its optical axis is parallel to the optical axis of the phototaking lens 20. As a result, the parallel plate glass is set at a position at the center of its moving range. Centering of the plate glass 52 is an essential operation after shake cancellation. Because the parallel plate glass 52 may be displaced from its initial position by accident when the camera is not operating, centering is performed after applying power. Similarly, because the parallel plate glass 52 may also be displaced from its initial position by accident while the camera is in stand-by mode, centering is also performed when the camera comes out of stand-by mode.

The camera according to the first embodiment of the present invention will proceed to the stand-by mode after a predetermined time period unless a switch is operated. After initializing a timer counter at step S5, the MμCOM 1 starts the timer counter at step S6. The timer counter will overflow after a predetermined time period, for instance 30 seconds. When the timer counter overflows, the MμCOM 1 proceeds to the stand-by mode. At step S7, the state of the MAINSW is determined. If the MAINSW is in the OFF state, operation proceeds to step S8 in which the MμCOM 1 outputs a centering request to the SμCOM 83. Then at step S9, the MμCOM 1 sets the output port p_POWER from LOW to HIGH to turn off the transistor Q1. At this point, power supply to the system is shut down, so that the MμCOM 1 as well as the SμCOM 83 will stop operating (step S10).

On the other hand, if in step S7 it is determined that the MAINSW is turned on, operation proceeds to step S11 in which the state of the MODESW is determined. The MODESW is a switch to be operated when camera shake compensation is required. When the MODESW is on, operation proceeds to step S12 in which it is determined whether the shake compensation circuitry is ready to perform camera shake compensation.

When the shake detecting circuits 87 and 88 are ready, the SμCOM 83 sets its output port p_EN$_1$, to a LOW level. This signal is detected by the MμCOM 1 which at step S13 sets a shake compensation enabled flag (COMP) to '1'. Then, at step S14, the MμCOM 1 re-initializes the timer counter. If the MODESW is turned ON, the timer counter is always initialized, so that the timer counter will not overflow. As a result, as long as the MODESW is ON, the MμCOM 1 and the SμCOM 83 will never enter the stand-by mode. After step S14, operation then proceeds to step S15.

If in step S11 it is determined that the MODESW is in the OFF state, operation proceeds directly to step S15. At step S15, the object brightness information is read from the metering circuit 5 into the MμCOM 1 which calculates an aperture value and a shutter speed value that are displayed, at step S16, by the displaying circuit 2. At step S17, the MμCOM 1 detects the state of the 1RSW. The 1RSW is turned on when the release button is pushed halfway of its full stroke.

If in step S17 the MμCOM 1 determines that the 1RSW is in the OFF state, operation proceeds to step S18 in which it is determined whether the timer counter has overflowed. If the shake canceling operation is not selected and if no camera operation is executed within the predetermined time period, then the timer counter overflows, in which case operation proceeds to step S19. At step S19, the MμCOM 1 sets its output port p_EN0 from a LOW level to a HIGH level to disable the SμCOM 83, thereby causing the SμCOM 83 to enter the stand-by mode.

At step S20, the MμCOM 1 enables its interrupt request input so that a signal appearing on the input port p_INT when any one of the MAINSW, the MODESW, the 1RSW, or the 2RSW is actuated, will cause an interrupt. At step S21 the oscillation of the resonator 82 is halted, and at step S22 the MμCOM 1 proceeds to the stand-by mode.

The MμCOM 1 comes out of stand-by mode upon generation of an interrupt signal. At this point, the resonator 82 begins to oscillate and operation resumes at step S3. If at step S18 it is determined that the timer counter has not overflowed, operation proceeds to step S7. If at step S17 it is determined that the 1RSW is in the ON state, operation then proceeds to step S23. At step S23, the MμCOM 1 calculates the degree of defocus on the basis of the data from the focus detecting block 32, and causes the motor control circuit 18 to move the phototaking lens 39.

At step S24, the MμCOM 1 determines the state of the 2RSW. The 2RSW turns on when the release button is fully depressed. If the 2RSW is in the OFF state, operation loops back to step S5 in which the timer counter is initialized. As such, even if the release button is only partially depressed (i.e., 1RSW is ON and 2RSW is OFF), the timer counter will not overflow. If in step S24 it is determined that the 2RSW is in the ON state, operation proceeds to step S25 (FIG. 5). At step S25, the MμCOM 1 causes the mirror 8 to turn up via the mirror control block 7 and via the aperture control block 16, causes the diaphragm 17 to be set at the calculated aperture setting.

At step S26, the MμCOM 1 determines the state of the MODESW. If the shake compensation mode is selected (ON), then operation proceeds to step S27 in which the MμCOM 1 determines the state of the compensation enable flag (COMP). If the COMP flag is set to '1', the MμCOM 1 sets its output port p_CONT1 to a LOW level so that the SμCOM 83 operates to cancel camera shake. Operation then proceeds to step S29 in which the MμCOM 1 by means of the shutter control block 11, causes the film to be exposed for a calculated time period.

At step S30, the MμCOM 1 again determines the state of the MODESW. If the MODESW is in the ON state, operation proceeds to step S31 in which the state of the COMP flag is determined. If the COMP flag is set to '1', operation proceeds to step S32 in which the MμCOM 1 sets the output port p_CONT1 from a LOW level to a HIGH level so that the SμCOM 83 discontinues camera shake compensation. Operation proceeds to step S33 in which the SμCOM 83 causes the mirror 8 to be turned down, and the diaphragm 17 to be fully opened. At step S34, the MμCOM 1 controls the film feed block 9 to wind up the film 10 by one frame, and commands the SμCOM 83 to perform a centering operation (step S4, FIG. 4). After this point, the operation sequence described above is repeated.

Figure 6:
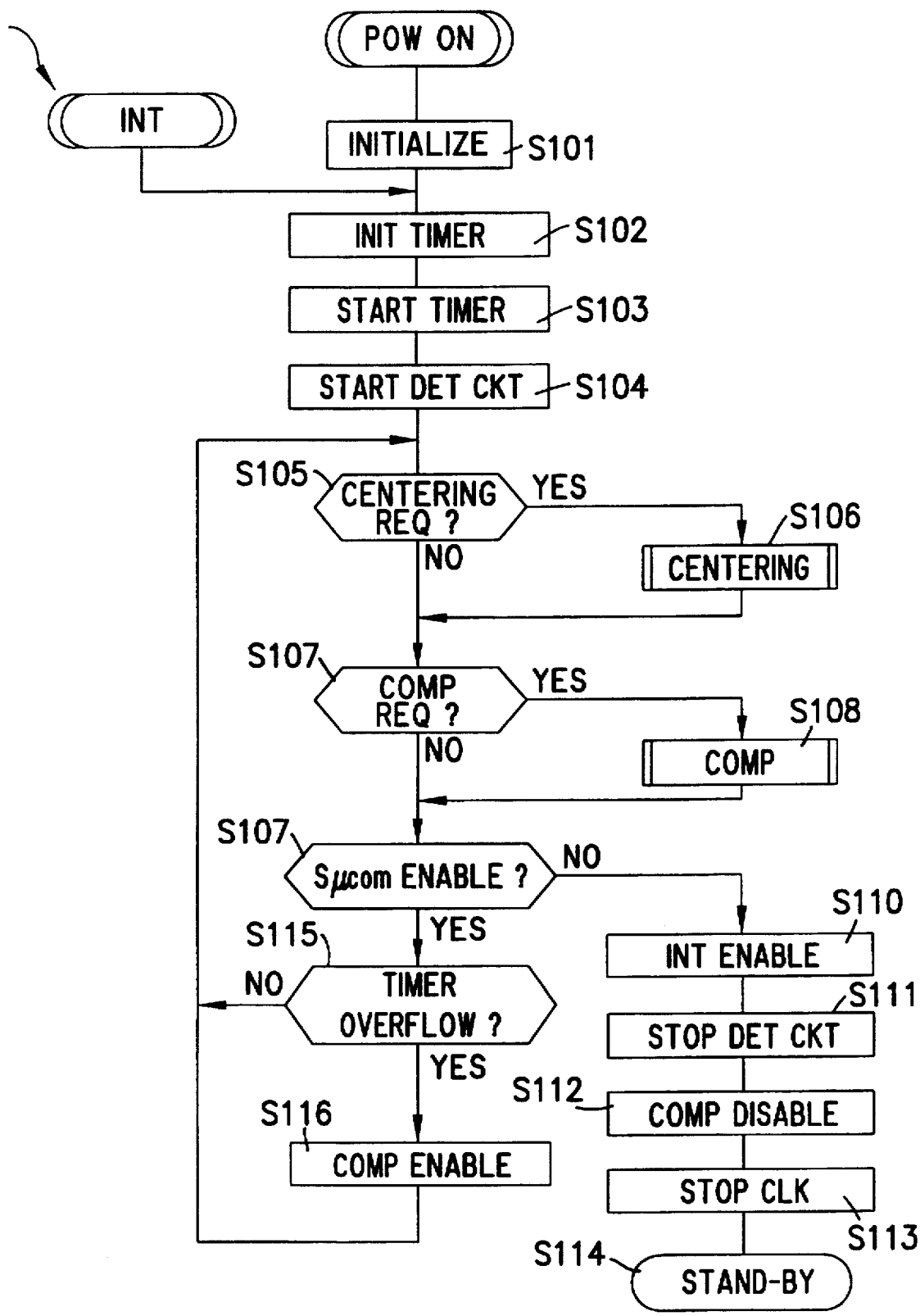
FIG. 6 is a flow-chart illustrating the operation of a secondary microcomputer of the first embodiment.

The operating sequence of the SμCOM 83 will now be described with reference to the flow-chart of FIG. 6. When the MAINSW is turned on, system power is supplied and the SμCOM 83 begins to operate together with the MμCOM 1.

At step S101, the SμCOM 83 initializes its I/O ports and memories. At step S102, the SμCOM 83 initializes its timer counter and at step 103 starts the timer counter. The setting time of the SμCOM's timer counter is determined in accordance with the response time of the shake detecting circuits 87 and 88. For example, if the outputs of the shake detecting circuits stabilize 10 seconds after the application of power, then the timer counter is set to overflow after 10 seconds.

At step S104, the SμCOM 83 sets its output port p_CS to a LOW level to turn on the transistor Q9 so that the shake detecting circuits 87 and 88 are supplied with power. At step S105, the SμCOM 83 determines whether the centering operation has been requested. The MμCOM 1 requests a centering operation by setting its output port p_CONT0 to a LOW level for a predetermined time period. Upon detecting the centering request, the SμCOM 83 proceeds to step S106 in which it begins to execute a centering subroutine ('CENTERING') which will be described further below. Operation then proceeds to step S107 in which the SμCOM 83 determines whether shake compensation has been requested. When the camera is exposing the film, the MμCOM 1 holds its output port p_CONT1 at a LOW level.

The SμCOM 83 executes a camera shake compensation operation when its input port p_CONT$_1$ senses a LOW level. That is, if in step S107 the SμCOM 83 detects a LOW level at its input port p_CONT$_1$, the SμCOM 83 executes the subroutine 'COMP' (step S108) which will be described further below.

At step S109, the SμCOM 83 determines whether the operation enable signal is outputted from the MμCOM 1 The SμCOM 83 is enabled to operate while its input port p_EN$_0$ is held at a LOW level. The SμCOM 83 proceeds to the stand-by mode, and halts its operation while the input port p_EN$_0$ is held at a HIGH level.

If in step S109 it is determined that the port p_EN$_0$ is at a HIGH level, operation proceeds to step S110 in which the interrupt input of the SμCOM 83 is enabled. The interrupt signal is generated by setting the output port p_EN$_0$ of the MμCOM 1 from a HIGH level to a LOW level. Upon detecting an interrupt signal, the SμCOM 83 comes out of stand-by mode and begins to operate at step S102. Otherwise, operation proceeds to step S111 in which the SμCOM 83 sets the output port p_CS from a LOW level to a HIGH level to turn off the transistor Q9 thereby disabling the shake detecting circuits 87 and 88. Operation then proceeds to step S112 in which the SμCOM 83 sets its output port p_EN$_1$, to a HIGH level to indicate to the MμCOM 1 that shake compensation has been disabled. Operation then proceeds to step S113 in which oscillation of the resonator 84 is stopped. Operation then proceeds to step S114 in which stand-by mode is entered.

On the other hand, if in step S109 it is determined that the port p_EN$_0$ is at a LOW level, operation proceeds to step S115 in which it is determined whether the timer counter has overflowed. The timer counter overflows when a predetermined time period has elapsed since the powering up of the shake detecting circuits 87 and 88. If the timer counter has overflowed, operation proceeds to step S116 in which the SμCOM 83 sets its output port p EN$_1$, to a LOW level. Operation then loops back to step S105 and the operation sequence described above is repeated.

Figure 7:
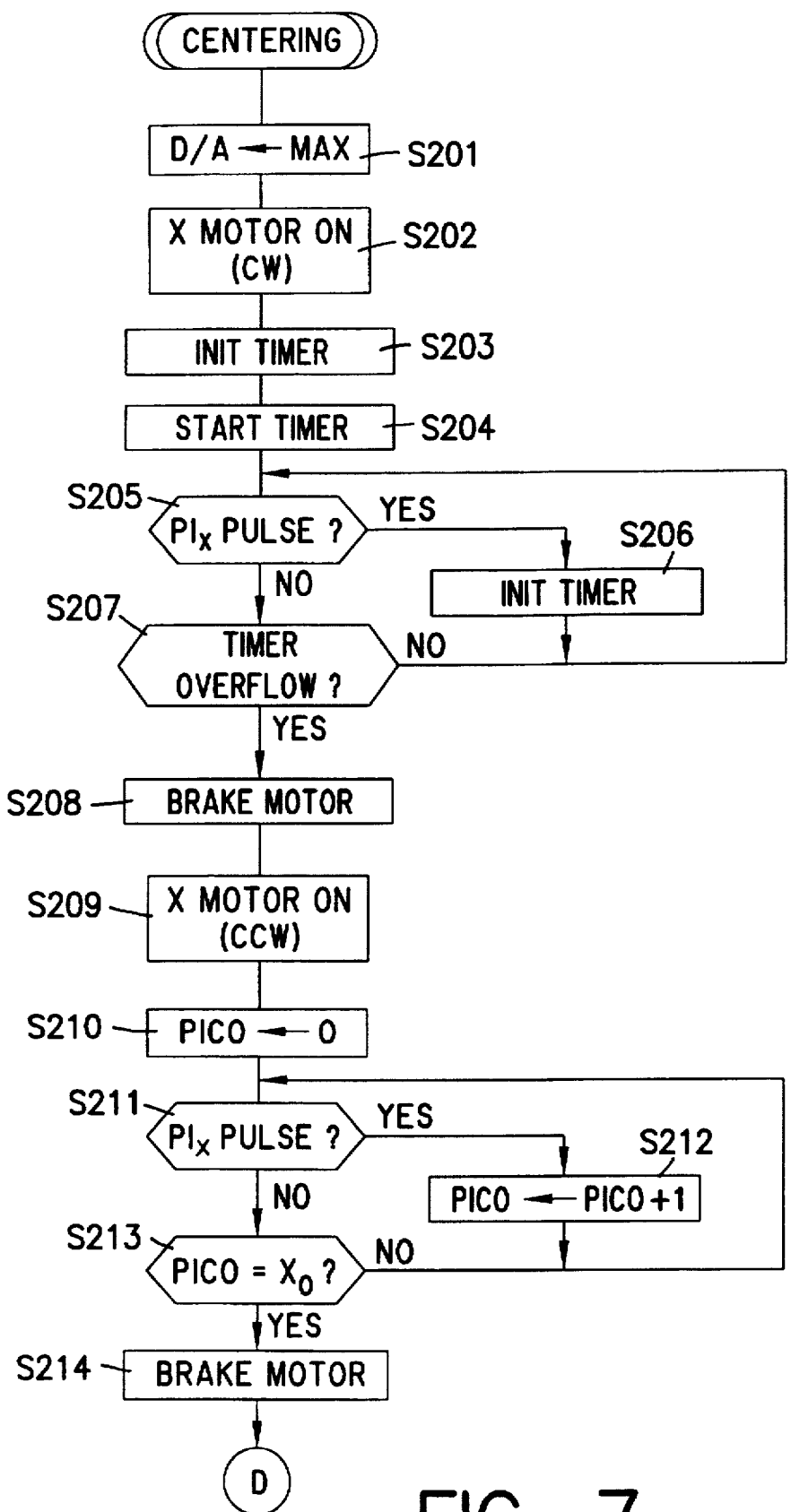
FIGS. 7 and 8 are flow-charts illustrating the operating sequence of a subroutine for centering a shake compensation mechanism.

The operating sequence of the CENTERING subroutine, represented by step S106, will now be described with reference to FIGS. 7 and 8. Execution of the centering subroutine causes the parallel plate glass 52 to be set at a center position of its rotation range so that the optical axis of the phototaking lens 20 is perpendicular to the face of the parallel plate glass.

Upon entering the centering subroutine, the SμCOM 83, at step S201, writes a maximum value to the D/A converter 83.1 for regulating the rate of revolution of the x-axis motor 65. At step S202, the SμCOM 83 then outputs signals, via the ports p_Mx0 through p_Mx3, for driving the motor 65 in a clockwise direction. At step S203 the SμCOM 83 initializes a timer counter which is started at step S204. The timer counter is used for determining whether the parallel plate glass 52 has reached its rotational limit position. The SμCOM 83 determines whether the parallel plate glass 52 has reached a limit of its rotational range on the basis of pulse signals generated by the photointerrupter 67 and detected at the input port p_PIx.

As determined in step S205, the photointerruptor 67 generates pulse signals while the motor 65 revolves, in which case the timer counter is initialized at step S206 and thus cannot overflow as long as the motor 65 revolves. When the parallel plate glass 52 reaches its limit position, the motor 65 stops, so that the photointerrupter 67 stops generating pulse signals, as determined at step S205. Eventually, as determined in step S207, the timer counter overflows and operation proceeds to step S208. At step S208, the SμCOM 83 outputs signals via the output ports p_Mx0 through p_Mx3 causing short circuit braking of the motor 65.

As shown in FIG. 2, the lever 68 on the x-axis of the gimbal ring touches one of the pins 69 or 70 fixed to the camera body when it reaches a rotational limit position. From this point, the parallel plate glass 52 is rotated from the limit position to a position halfway along its rotational range. In order to achieve the object described above, the SμCOM 83, at step S209, outputs via the output ports p_Mx0 through p_Mx3 signals for causing the motor 65 to rotate in a counter-clockwise direction. Then, at steps S210 to S213, the SμCOM 83 monitors the angular displacement of the glass 52.

At step S210, a counter PICO is reset to zero. The counter PICO is incremented at step S212 whenever it is determined at step S211 that a pulse signal has been applied to the input port p_PIx. If the value of the counter PICO is in agreement with a predetermined value X0, then the motor 65 is short circuit braked at step S214. The value X0 is the number of pulse signals corresponding to the angular displacement of the parallel plate glass 52 from the limit position to the midway position. Thus, centering of the plate glass 52 with regard to the x-axis is achieved.

Figure 8:
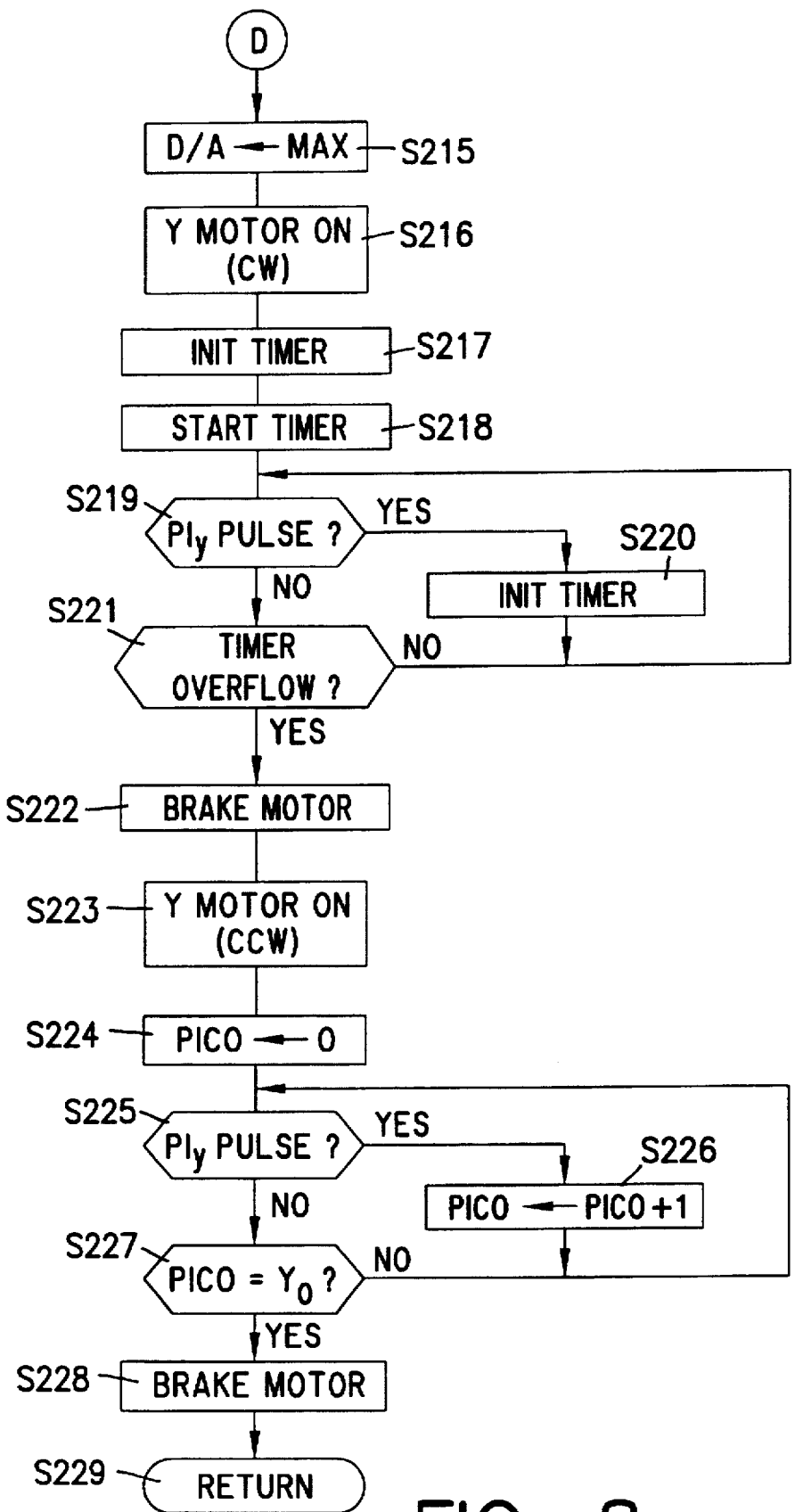

As shown in FIG. 8, centering of the plate glass 52 with regard to the y-axis is then executed in similar fashion. A detailed description of the y-axis centering procedure (steps S215 through S228) is omitted due to the similarity with the x-axis centering procedure described above.

Figure 9:
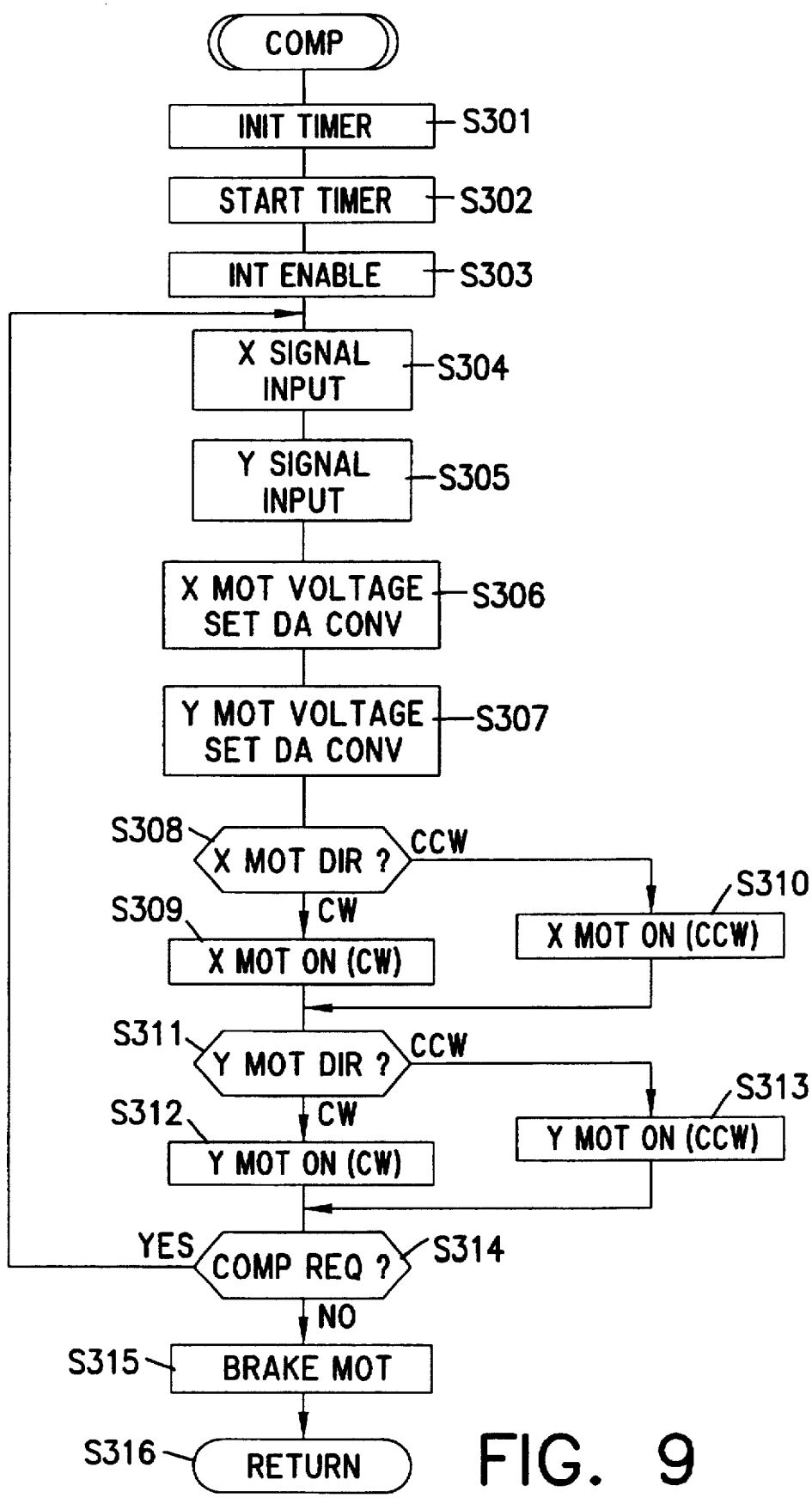
FIG. 9 is a flow-chart illustrating the operation sequence of a shake compensation subroutine of the first embodiment.

The operating sequence of the subroutine 'COMP', represented by step S108, will now be described with reference to FIG. 9. At step S301, the SμCOM 83 initializes a timer counter which is then started at step S302. This timer counter is used in determining the rate of revolution of the x-axis motor 65 and the y-axis motor 56. By determining the rates of revolution of the motors 65 and 56, the rate of revolution of the parallel plate glass 52 with respect to the x- and y-axes of the gimbal ring are respectively determined. The rates of revolution of the motors 65 and 56 are detected by counting the pulse signals from the photointerrupters 67 and 58, respectively, using the timer counter.

At step S303, interrupt requests are enabled. An interrupt routine is executed when a pulse signal from either of the photointerrupters 67 or 58 is applied to the corresponding input port p_PIx or p_PIy. At step S304, the SμCOM 83 inputs signals from the x-axis shake detecting circuit 87 via the A/D converter 83.3. The output signal of the A/D converter 83.3 represents the angular velocity, with respect to the x-axis, of any camera shaking. At step S305, the SμCOM 83 also reads signals from the y-axis shake detecting circuit 88 via the AD converter 83.4. The output signal of the A/D converter 83.4 represents the angular velocity of any camera shaking with respect to the y-axis.

At step S306, the SμCOM 83 loads the D/A converter 83.1 with data for regulating the x-axis motor 65. This data is obtained from the rate of revolution of the x-axis motor 65, the rate of revolution of the y-axis motor 56, and a coefficient Kx. The rate of revolution of the x-axis motor 65 is obtained in the interrupt subroutine 'INT' shown in FIG. 10(a). The coefficient Kx is defined by the gear reduction ratio of the gear train connected to the motor 65, the optical property of the glass 52, and the characteristics of the x-axis shake detecting circuit 87.

At step S307, the SμCOM 83 loads the D/A converter 83.2 with data for regulating the y-axis motor 56, which data is obtained in similar fashion as in step S306. The x-axis motor 65 is driven clockwise (CW) or counter clockwise (CCW) on the basis of the x-axis component of the shake signal (steps S308 through S310). The y-axis motor 56 is driven clockwise (CW) or counter clockwise (CCW) on the basis of the y-axis component of the shake signal (steps S311 through S313).

At step S314, the SμCOM 83 determines whether shake compensation is requested. If the port p_CONT1 is at a LOW level, then operation loops back to step S304 in order to continue shake compensation. After completing the exposure process, the port p_CONT1 is driven to a HIGH level in which case operation proceeds to step S315 in which the x-axis motor 65 and the y-axis motor 56 are short-circuit braked to complete the shake compensation.

Figure 10:
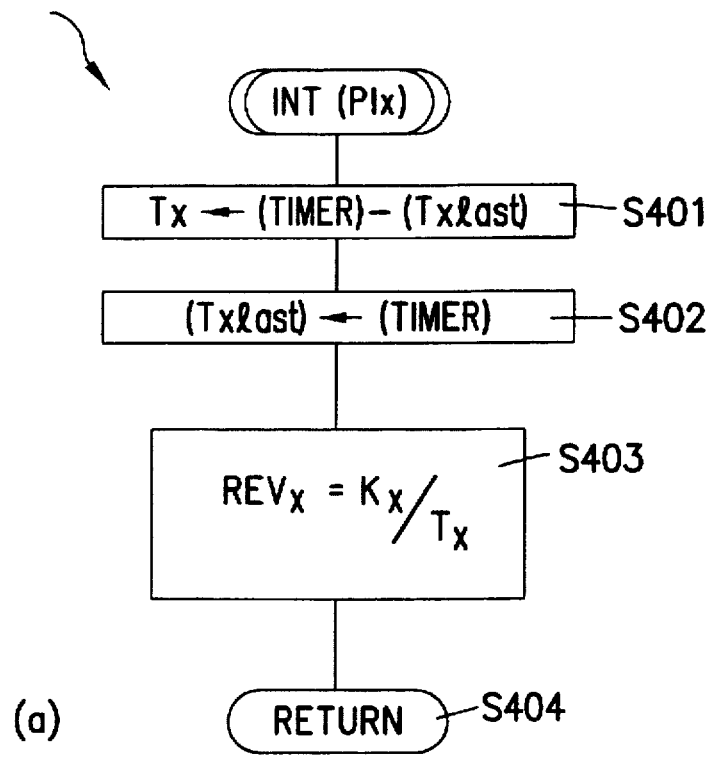
FIG. 10 is a flow-chart illustrating the operation sequence of an interrupt routine of the first embodiment.
Figure 10:
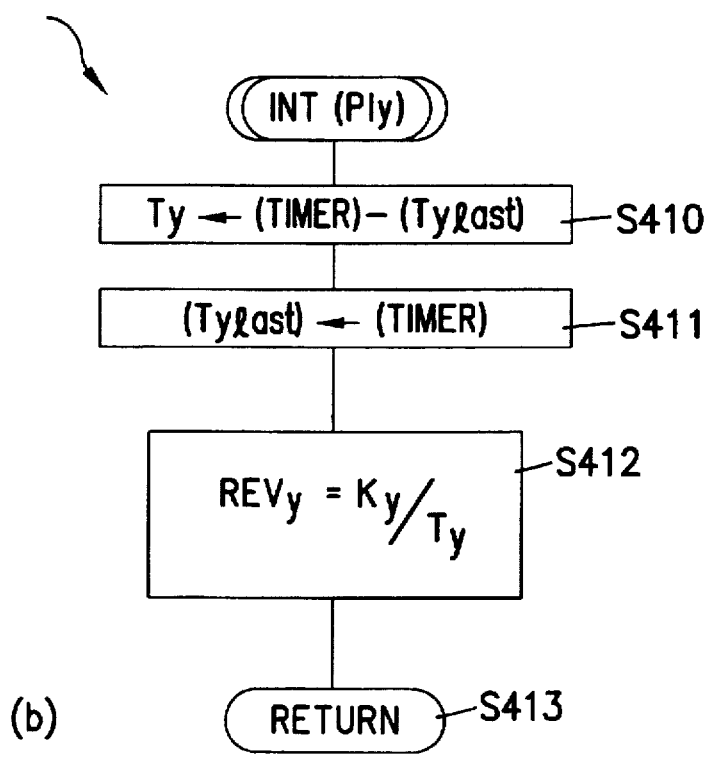

FIG. 10(a) illustrates the operating sequence of an interrupt routine to be executed when a pulse signal of the photointerrupter 67 is applied to the port p_PIx. In step S401, an interval time Tx of the pulse signals generated by the photointerrupter 67 is obtained by determining the difference between the current value of the timer counter and a previous value Txlast of the timer counter. In step S402, the current value of the timer counter is stored as Txlast. In step S403, the revolution rate REVx of the x-axis motor 65 is determined by dividing a coefficient Kx by the interval time Tx of the pulse signals generated by the photointerrupter 67. The coefficient Kx is defined by the number of slits on the disk 66, which is connected to the x-axis motor 65.

FIG. 10(b) illustrates the operating sequence of an interrupt routine to be executed when a pulse signal of the photointerrupter 58 is applied to the port p_PIy. In this interrupt routine, the rate of revolution of the y-axis motor 56 is obtained. In step S410, an interval time Ty of the pulse signals of the photointerrupter 58 is obtained by determining the difference between the current value of the timer counter and a previous value Tylast of the timer counter. In step S411, the current value of the timer counter is stored as Tylast. In step S412, the rate of revolution of the y-axis motor 56 is determined using a coefficient Ky and the interval time Ty of the pulse signals of the photointerrupter 58. The coefficient Ky is defined by the number of slits on the disk 57, which is connected to the y-axis motor 56.

A second embodiment of a camera capable of shake compensation in accordance with the present invention will now be described. In the first embodiment, whenever shake compensation is enabled, the whole circuit system never proceeds to the stand-by mode. That is, the two microcomputers (the MμCOM 1 and the SμCOM 83) are prohibited to enter the stand-by mode from the usual operating mode. However, because the shake detecting circuits 87 and 88 are controlled by the SμCOM 83, the MμCOM 1 can enter stand-by mode with no compromise in performance since all the circuits controlled by the MμCOM 1 are ready to operate upon leaving stand-by mode. As such, shake compensation can be enabled while still conserving battery power by powering down a sub-set of components.

In the camera according to the second embodiment of the present invention, whenever the camera shake compensation mode is enabled, the SμCOM 83 and the shake detecting circuits 87 and 88 are not allowed to enter stand-by mode whereas the MμCOM 1 is allowed to enter stand-by mode. The operation of this embodiment is depicted in the flow charts of FIGS. 11 and 12. The differences in operation between the second embodiment and the first embodiment (depicted in FIGS. 4 and 5) will now be described.

Figure 11:
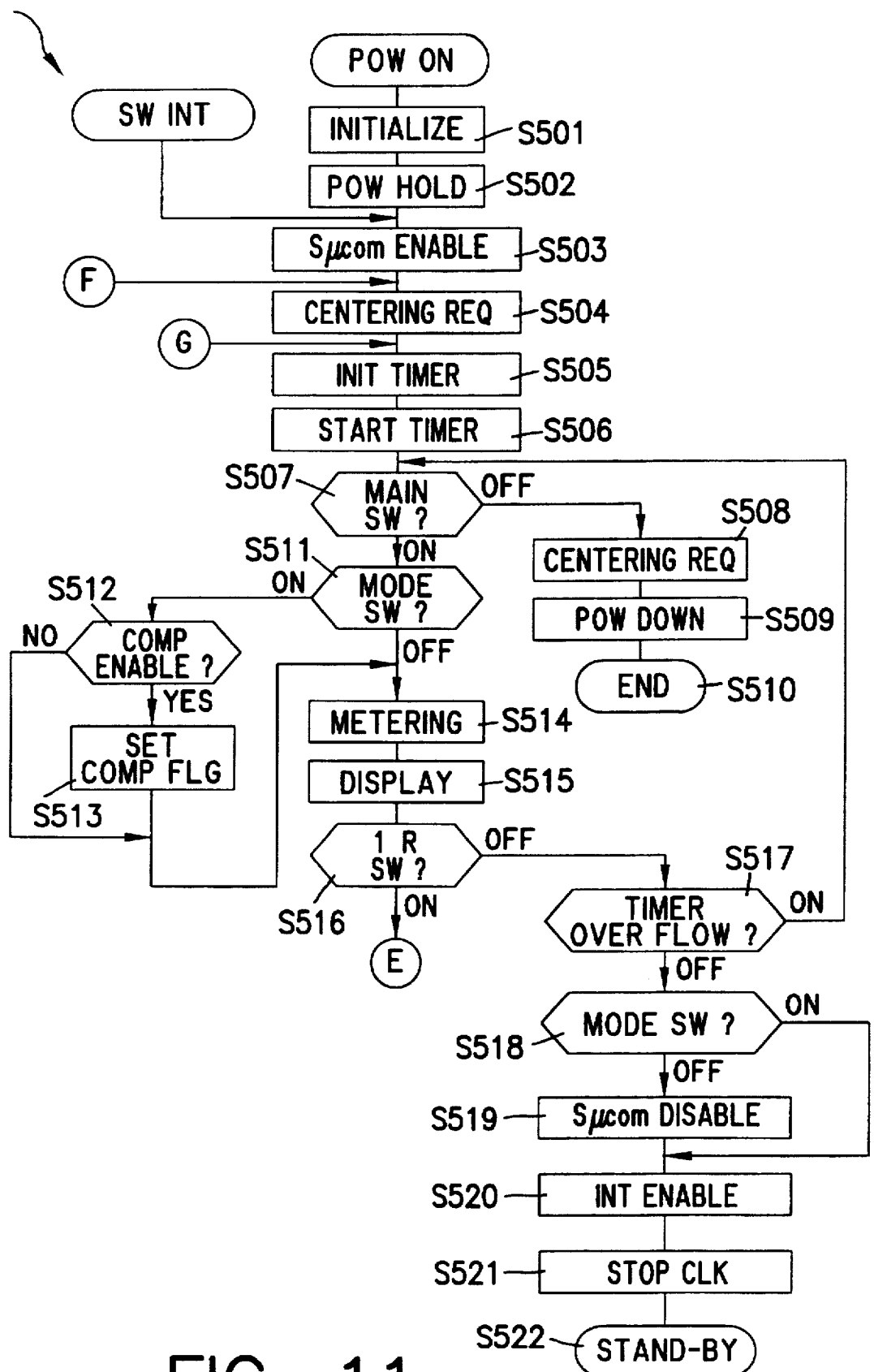
FIGS. 11 and 12 are flow-charts illustrating the operation of a main microcomputer of a second embodiment of the present invention.
Figure 12:
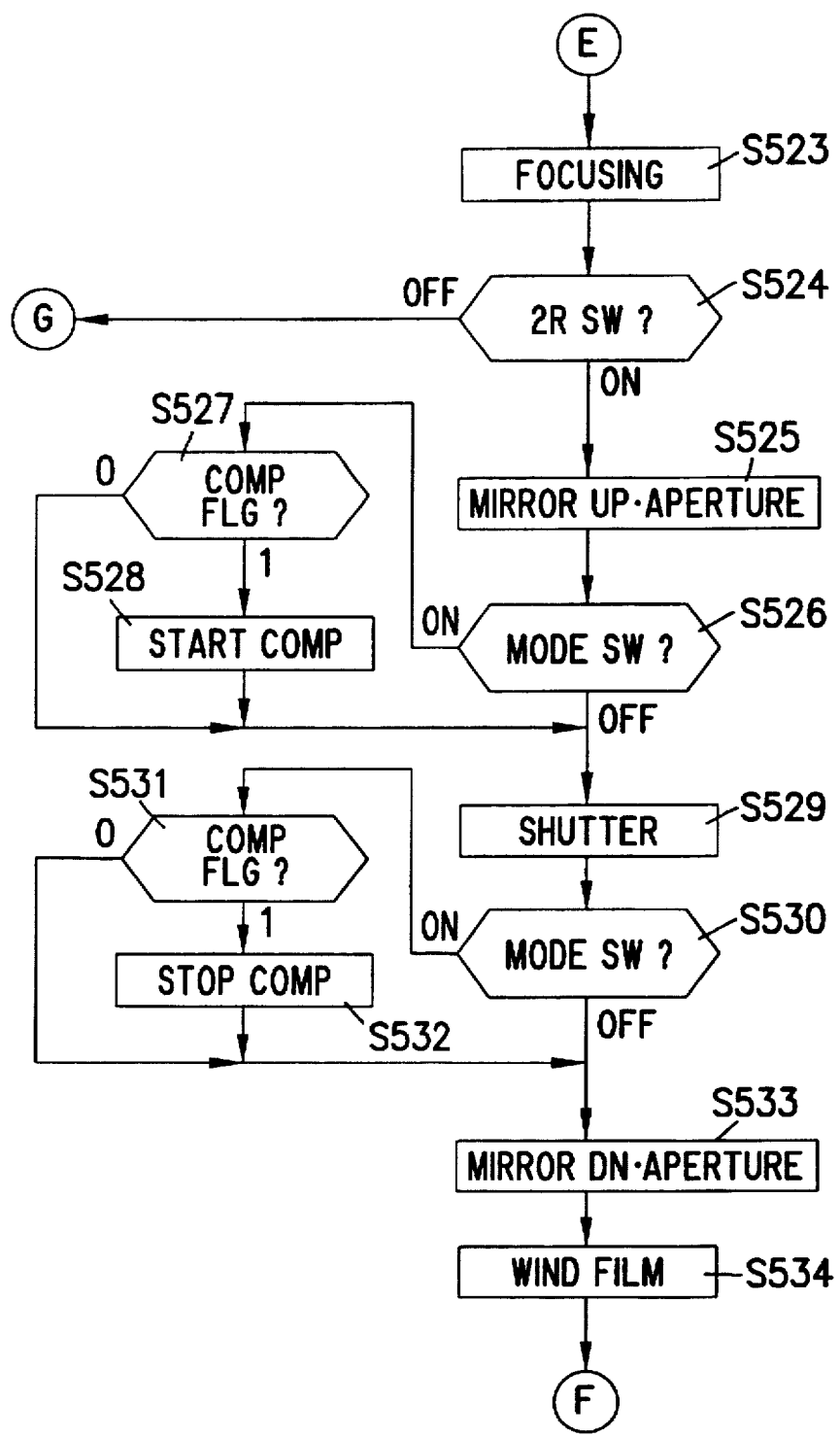

In the second embodiment, there is no equivalent of step S14 (FIG. 4) in FIG. 11. If there were such a step in FIG. 11, the timer counter would not overflow while shake compensation is enabled, so that the MμCOM 1 could not proceed to the stand-by mode. The operation of the second embodiment also includes an additional step S518 in FIG. 11, not in the operating sequence of the first embodiment shown in FIG. 4. At step S19 of the flow-chart of FIG. 4, the output port p_EN0 is set from a LOW level to a HIGH level as a result of entering the stand-by mode so that the SμCOM 83 is allowed to also enter the stand-by mode. In the operation of the second embodiment, however, as shown in the flow-charts of FIGS. 11 and 12, the SμCOM 83 is not allowed to enter stand-by mode if it is determined in step S518 that the MODESW is ON. As such, power is supplied to the shake detecting circuits 87 and 88 while the shake compensation mode is selected so that the shake compensation circuitry is ready to perform shake compensation immediately when the remaining circuitry comes out of stand-by mode.

When a camera is mounted onto a tripod or when using an electric flash, camera shake need not be considered. Thus, shake compensation, in accordance with the present invention, is executed only when shake compensation is considered necessary. Power is not shut down more than needed whenever the shake compensation mode is selected. As a result, a camera capable of shake compensation according to the present invention can use the battery power effectively while avoiding the problems associated with the powering-up of the shake compensation circuitry.

The above described preferred embodiments are intended to illustrate the principles of the present invention, but not to limit the scope of the present invention. Various other embodiments and modifications to these preferred embodiments may be made by those skilled in the art, without departing from the scope of the following claims.

What is claimed is:

1. A camera capable of shake compensation, comprising:
   a shake detecting block;
   a mode switch for setting the camera to shake compensation mode;
   a compensation member for deflecting light passing through an optical system of the camera in response to an output of the shake detecting block when the camera is in the shake compensation mode;
   a timer;
   mode transition means for changing an operating mode of the camera, in response to an output of the timer, from a fully operating mode to a power saving mode in which a minimum number of functional blocks of the camera are enabled; and
   mode transition prohibiting means for prohibiting the shake detecting block from becoming disabled while the camera is set to the shake compensation mode.

2. A camera capable of compensating for camera shake on the basis of an output of a shake detecting means including shake sensors provided in the camera body for sensing camera blur and high-pass filter circuits respectively connected to the shake sensors for eliminating low frequency signal components of output signals from the shake sensors, the camera comprising:
   a power supply for supplying power to the shake detecting means;
   a timer for counting a first predetermined time period corresponding to a settling time of the output of the shake detecting means after power has been applied to the shake detecting means;
   a mode setting means for setting the camera to shake compensation mode;
   a shake compensation member for optically compensating image blur when the camera is in the shake compensation mode;
   an initializing means for initializing the timer to count a second predetermined time period while the camera is set to the shake compensation mode; and
   a mode transition means for changing an operating mode of the camera from a fully operating mode to a power saving mode in which a minimum number of functional blocks of the camera are enabled including the power supply means and said shake detecting means if no camera operation is applied within the second time period.

3. The camera according to claim 2, further comprising:
   a first controller for controlling at least the shake detecting means; and
   a second controller for controlling all camera functions except for any functions controlled by the first controller,
   wherein the second controller halts while the camera is in the power saving mode.

4. A camera capable of compensating for camera shake on the basis of detected camera shake information, comprising:
   a first controller for controlling at least a shake detecting means including shake sensors provided in the camera body for sensing camera blur and high-pass filter circuits respectively connected to the shake sensors for eliminating low frequency signal components of output signals from the shake sensors;
   a second controller for controlling all camera functions other than the shake detecting means;
   a timer for counting a predetermined time period representing a settling time of an output signal of the shake detecting means;
   a mode transition means for changing an operating mode of the camera to a power saving mode in which a minimum number of functional blocks of the camera are enabled; and
   a mode setting means for setting the camera to a shake compensation mode,
   wherein the mode transition means enables the first controller and disables the second controller if no operation has been applied to the camera within the predetermined time period and if the camera is set to the shake compensation mode.

5. A camera which enters a power saving state unless a camera operation is applied within a predetermined time period, and which is capable of optically compensating for camera shake, the camera comprising:
   a mode select switch for selecting at least a shake compensation mode;
   a shake detecting circuit for detecting camera shake, the shake detecting circuit including shake sensors provided in the camera body for sensing camera blur and high-pass filter circuits respectively connected to the shake sensors for eliminating low frequency signal components of output signals from the shake sensors; and
   a controller which maintains the application of power to the shake detecting means while the camera is in the power saving state and the shake compensation mode has been selected.

6. A camera capable of optically compensating for camera shake, comprising:
- a selecting means for selecting a shake compensation mode;
- a shake detecting means for detecting camera shake, the shake detecting means including shake sensors provided in the camera body for sensing camera blur and high-pass filter circuits respectively connected to the shake sensors for eliminating low frequency signal components of output signals from the shake sensors;
- a first controller for controlling at least the shake detecting means;
- a second controller for controlling camera functional blocks other than the shake detecting means; and
- a power saving means for setting the camera functional blocks controlled by the second controller to a power saving mode, wherein the power saving means is initialized during a camera operation and sets the functional blocks controlled by the second controller to the power saving mode after counting a predetermined time period after completion of the camera operation.

7. A camera capable of compensating for camera shake, comprising:
- a mode setting means for setting the camera to a shake compensation mode;
- a shake detecting means for detecting camera shake and for outputting shake information while the camera is set to the shake compensation mode, the shake detecting means including shake sensors provided in the camera body for sensing camera blur and high-pass filter circuits respectively connected to the shake sensors for eliminating low frequency signal components of output signals from the shake sensors;
- a shake compensation member deflecting light passing through an optical system of the camera in response to output signals from the high-pass filter circuits when the camera is in the shake compensation mode; and
- a power saving mode transition means for changing an operating mode of the camera from a fully operating mode to a power saving mode in which a minimum number of functional blocks of the camera are enabled including the power supply and said shake detecting means.

8. The camera according to claim 7, further comprising:
- a first controller for controlling camera functional blocks including at least the shake detecting means; and
- a second controller for controlling camera functional blocks except for the functional blocks controlled by the first controller, and for setting the camera to a power save mode when no operation is applied to the camera within a predetermined time period.

9. A camera capable of compensating image blur on an exposure aperture on the basis of shake information from a shake detecting means, the camera comprising:
- a first microcomputer for controlling an operating sequence of the camera other than a shake compensation operation;
- a second microcomputer which operates according to commands from the first microcomputer to perform:
   - a stand-by operation during which the first microcomputer is disabled and the second microcomputer and the shake detecting means are enabled, thereby allowing the camera to operate in a power saving state,
   - a centering operation for setting a shake compensation member to an initial position,
   - a shake compensation operation which compensates image blur due to camera shake by driving the shake compensation member to deflect light passing through an optical system of the camera; and
- a mode setting means for setting the camera to a shake compensation mode.

10. The camera according to claim 9, wherein the first microcomputer prohibits the second microcomputer from performing the stand-by operation.

11. The camera according to claim 9, wherein the first microcomputer sets the camera to a stand-by mode if no operation is applied to the camera within a predetermined time period, and sets the camera from the stand-by mode to a fully operating mode while commanding the second microcomputer to perform the centering operation if any operation is applied to the camera in the stand-by mode.

* * * * *